US011188656B2

(12) United States Patent
Cooreman (10) Patent No.: US 11,188,656 B2
(45) Date of Patent: Nov. 30, 2021

(54) SECURE SOFTWARE SYSTEM FOR MICROCONTROLLER OR THE LIKE AND METHOD THEREFOR

(71) Applicant: Silicon Laboratories Inc., Austin, TX (US)

(72) Inventor: Steven Jan Anne Ward Cooreman, Nittedal (NO)

(73) Assignee: Silicon Laboratories Inc., Austin, TX (US)

( * ) Notice: Subject to any disclaimer, the term of this patent is extended or adjusted under 35 U.S.C. 154(b) by 504 days.

(21) Appl. No.: 16/047,261

(22) Filed: Jul. 27, 2018

(65) Prior Publication Data

US 2020/0034544 A1 Jan. 30, 2020

(51) Int. Cl.
*G06F 21/57* (2013.01)
*G06F 8/41* (2018.01)
*G06F 9/30* (2018.01)
*G06F 21/54* (2013.01)

(52) U.S. Cl.
CPC ............ *G06F 21/577* (2013.01); *G06F 8/427* (2013.01); *G06F 8/443* (2013.01); *G06F 9/30021* (2013.01); *G06F 9/30058* (2013.01); *G06F 21/54* (2013.01); *G06F 2221/033* (2013.01)

(58) Field of Classification Search
CPC ........ G06F 21/577; G06F 8/443; G06F 8/427; G06F 9/30058; G06F 9/30021; G06F 21/54; G06F 2221/033; G06F 8/4434; G06F 21/77
See application file for complete search history.

(56) References Cited

U.S. PATENT DOCUMENTS 6,760,906 B1 * 7/2004 Odani ..................... G06F 8/456
717/146
7,856,629 B2 12/2010 Michimoto et al.
(Continued)

OTHER PUBLICATIONS

Silicon Laboratories Inc.; EFM32TG11 Family Data Sheet; Preliminary Rev. 0.5; 157 pages.
(Continued)

*Primary Examiner* — Matthew Smithers
*Assistant Examiner* — Mirza Israr Javed
(74) *Attorney, Agent, or Firm* — Polansky & Associates, P.L.L.C.; Paul J. Polansky (57) ABSTRACT

In one form, a software system includes a first non-transitory computer readable medium storing a source code program, a second computer readable medium, and a compiler. The first non-transitory computer readable medium includes a first function having a return type greater than a native width of a target processor, and a second function that calls the first function and that conditionally branches based on comparing a returned value from the first function to an expected value, wherein the expected value has first and second portions that are not equal to zero and are not equal to each other. The compiler converts the source code program in the first non-transitory computer readable medium into a machine language program for storage in the second computer readable medium. The compiler optimizes the source code program by selectively combining a set of redundant machine language instructions into a smaller set of machine language instructions.

20 Claims, 10 Drawing Sheets

(56) References Cited

U.S. PATENT DOCUMENTS

| | | | | |
|---|---|---|---|---|
| 2004/0194071 | A1* | 9/2004 | Tanaka | G06F 8/441 |
| | | | | 717/136 |
| 2006/0277529 | A1* | 12/2006 | Michimoto | G06F 8/433 |
| | | | | 717/136 |
| 2020/0034544 | A1* | 1/2020 | Cooreman | G06F 21/577 |

OTHER PUBLICATIONS

S. Ordas, L. Guillaume-Sage, P. Maurine; Electromagnetic Fault Injection : the curse of flip-flops; Journal of Cryptographic Engineering; Mar. 2016; 16 pages.

Nicolas Moro, Amine Dehbaoui, Karine Heydemann, Bruno Robisson, Emmanuelle Encrenaz; "Electromagnetic Fault Injection: Towards a Fault Model on a 32-bit Microcontroller"; Workshop on Fault Diagnosis and Tolerance in Cryptography; Aug. 2013; Santa Barbara, CA; United States; ISBN: 978-0-7695-5059-6; 12 pages.

Nicolas Moro, Amine Dehbaoui, Karine Heydemann, Bruno Robisson, Emmanuelle Encrenaz; "Experimental Evaluation of Two Software Countermeasures Against Fault Attacks"; IEEE HOST Symposium; May 2014; Arlington, VA; United States; 22 pages.

Tim Hummel; "Exploring Effects of Electromagnetic Fault Injection on a 32-bit High Speed Embedded Device Microprocessor"; Master Thesis; EIT ICT Labs Master School, University of Twente; Enschede, Netherlands; Jul. 2014; 76 pages.

Nicolas Moro, Karine Heydemann, Bruno Robisson, Emmanuelle Encrenaz; "Formal Verification of a Software Countermeasure Against Instruction Skip Attacks"; Journal of Cryptographic Engineering; Feb. 2014; 17 pages.

* cited by examiner

START
⋮

SUCCESS    str r0, 0x00000001
           str r1, 0xFFFFFFFF
           ⋮

FAILURE    str r0, 0x00000002
           str r1, 0xFFFFFFFE
           ⋮ bx RETURN

1020

⋮

RETURN     blx START
           cmp r0, 0x00000001
           bne NOT_EQ
           cmp r1, 0xFFFFFFFF
           beq NOT_EQ
           ⋮

NOT_EQ
           ⋮

SECURE SOFTWARE SYSTEM FOR MICROCONTROLLER OR THE LIKE AND METHOD THEREFOR

FIELD

This disclosure relates generally to security for computer systems, and more specifically to a secure software system for a microcontroller or other computer system.

BACKGROUND

Hackers attempt to gain access to computer systems, such as smart card chips, in an effort to steal valuable user data, passwords, and the like. One technique hackers use is to inject electrical faults to cause circuits to malfunction in ways that give the hackers access to the memory and other resources of the smart card chip. Fault injections are a serious threat against these chips. There are several known methods to inject faults within these data processing systems. The known methods include laser, voltage, and electromagnetic (EM) fault injection. Laser fault injection is a popular method due to its high spatial and temporal resolutions. However, laser fault injection has limitations. An increased number of metal layers for routing signals in a chip, as well as progressive countermeasures increase the inefficiency of laser attacks. Voltage spike injection is also utilized by injecting a voltage spike directly into a substrate of a targeted integrated circuit. Voltage spike injection produces ground bounces or voltage drops with respect to the intensity of the spike. EM fault injection is more commonly being utilized for targeted attacks that aim to disrupt logic circuit behavior within these chips.

EM Pulse (EMP) injection is produced by a high voltage pulse generator and an injector. EMP injection has been used to create faults that are exploitable by hackers to steal user's data. EMP injection produces a single but powerful EMP at a desired time and location on a targeted integrated circuit that induces sudden voltage spikes in the chip that can lead to data and timing faults. If these faults occur at critical points in program execution, they can create program errors such as incorrect changes of program flow that allow hackers to gain control of the program and ultimately to steal valuable data.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, a software system includes a first non-transitory computer readable medium storing a source code program, a second computer readable medium, and a compiler. The first non-transitory computer readable medium includes a first function having a return type greater than a native width of a target processor, and a second function that calls the first function and that conditionally branches based on comparing a returned value from the first function to an expected value, wherein the expected value has first and second portions that are not equal to zero and are not equal to each other. The compiler converts the source code program in the first non-transitory computer readable medium into a machine language program for storage in the second computer readable medium. The compiler optimizes the source code program by selectively combining a set of redundant machine language instructions into a smaller set of machine language instructions.

In another form, a software system includes a first non-transitory computer readable medium storing a source code program, a second computer readable medium, and a compiler. The source code program includes a first function that defines a success status and a failure status each having a width greater than an architectural width of a target processor, wherein each of the success status and the failure status has first and second portions that are not equal to zero and are not equal to each other. The first function selectively returns one of the success status and the failure status to a calling program. The second function calls the first function and conditionally branches based on whether the first function returns the success status or the failure status. The compiler converts the source code program in the first non-transitory computer readable medium into a machine language program for storage in the second computer readable medium. The compiler optimizes sets of redundant instructions and selectively combines the set of redundant instructions into a corresponding single machine language instruction.

In yet another form, a method includes providing a first function of a source code program. The providing includes defining a type of the first function to be greater than a native width of a target processor and returning a status based on execution of the first function. A second function of said source code program is also provided. The second function calls the first function and conditionally branches based on comparing a returned value from the first function to an expected value, wherein the expected value has first and second portions that are not equal to zero and are not equal to each other. The source code program is compiled into a corresponding machine language program using an optimizing compiler that optimizes the source code program by selectively combining a set of redundant machine language instructions into a smaller set of machine language instructions. The corresponding machine language program is stored in a computer readable medium.

In still another form, a microcontroller includes a central processing unit and a memory. The central processing unit executes instructions using registers of an architectural register file each having a native width. The memory is coupled to the central processing unit and stores a plurality of instructions executable by the central processing unit. The memory includes a first function having an entry point and a plurality of instructions including a first instruction that stores a first value having the native width in a first register of the architectural register file, a second instruction having the native width that stores a second value in a second register of the architectural register file, and a third instruction that returns program control to a calling function. The first and second values and the first and second registers have the native width, and the first and second values are not equal to zero and are not equal to each other. The second function calls the first function and conditionally branches based on whether the first value is equal to a first predetermined value and the second value is equal to a second predetermined value.

Figure 1:
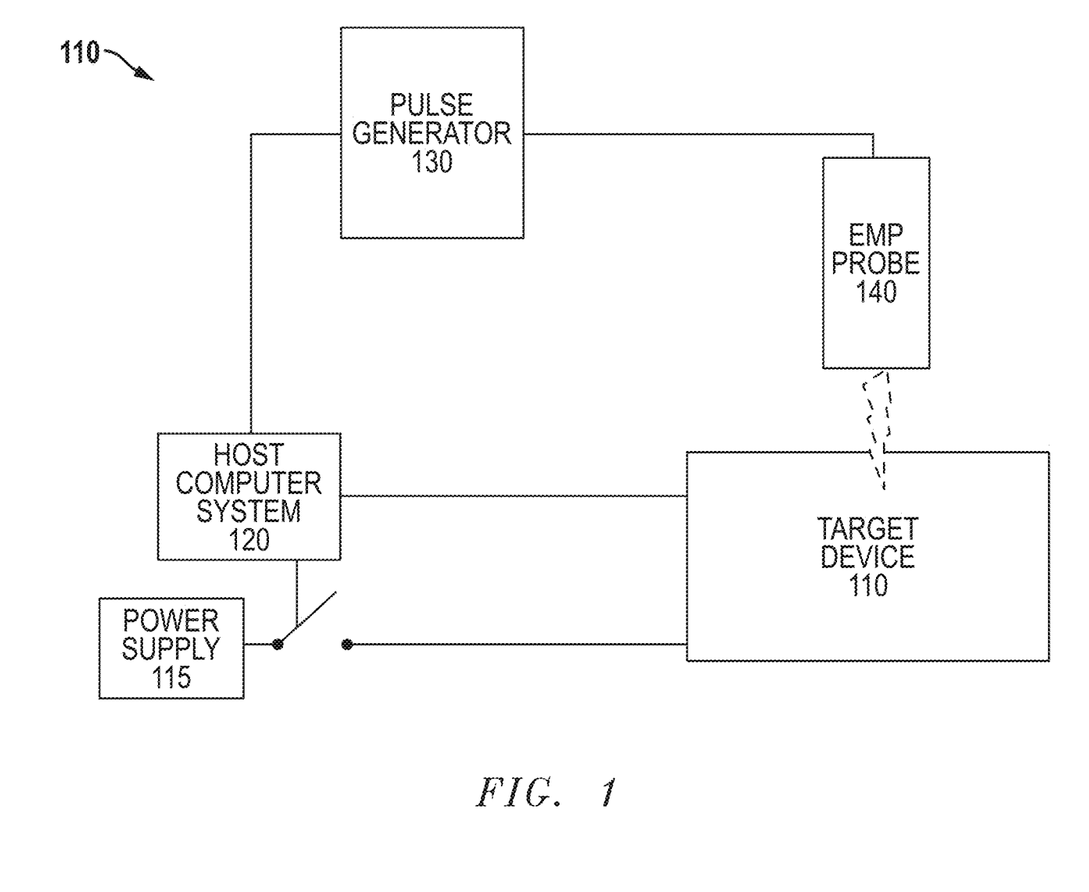
FIG. 1 illustrates in block diagram form an electromagnetic pulse (EMP) fault injection system that a hacker may use to inject a fault into a computer system such as a microcontroller (MCU) chip.

FIG. 1 illustrates in block diagram form an electromagnetic pulse (EMP) fault injection system 100 that a hacker may use to inject a fault into a computer system such as a microcontroller (MCU) chip. EMP fault injection system 100 includes a target device 110, a power supply 115, a host computer system 120, a pulse generator 130, and an EMP probe 140. Host computer system 120 is connected to power supply 115, pulse generator 130, EMP probe 140, and target device 110.

In one example, host computer system 120 executes an EMP sweep on target device 110. The EMP sweep varies the timing and physical location of the EMP injection to attempt to get the software running on target device 110 to fail in a way that allows host computer system 120 to gain control of the software. Pulse generator 130 provides the EMP to EMP probe 140 for injecting the fault to target device 110. EMP probe 140 is a miniaturized EMP injector positioned above target device 110. EMP probe 140 discharges a capacitor bank into a coil upon receiving a pulse from pulse generator 130, thereby creating an EMP. Pulse generator 130 waits a predefined time (glitch offset) and emits a pulse when a trigger signal is asserted by target device 110. Host computer system 120 communicates with target device 110 and monitors the behavior of target device 110. In one example, power supply 115 is an interruptible power supply that enables host computer system 120 to interrupt the power supply to target device 110 and to force a reboot of the target device.

EMP fault injection system 100 includes a stepper motor, not shown in FIG. 1, for manipulating target device 110 and/or EMP probe 140. A voltage pulse of a specified amplitude is applied (e.g. voltage: 200 V, current: 8A) by EMP probe 140 to a localized area for a specified duration (e.g. 5 ns to 100 ns) at the surface of target device 110. Host computer system 120 initiates a glitch sweep of the EMP across the surface of target device 110 to generate a timing fault during boot of target device 110. In one example the sweep is performed at a fixed glitch offset (time) at a predetermined glitch intensity and duration. Initiating at a first location, target device 110 is reset, EMP probe 140 applies the EMP, and host computer system 120 detects a result. EMP probe 140 is stepped to the next location and the process is repeated. Host computer system 120 continues to monitor target device 110 to determine when target device 110 fails to operate properly during a function call, allowing host computer system 120 to provide instructions that allow memory on target device 110 to be read and altered.

Figure 2:
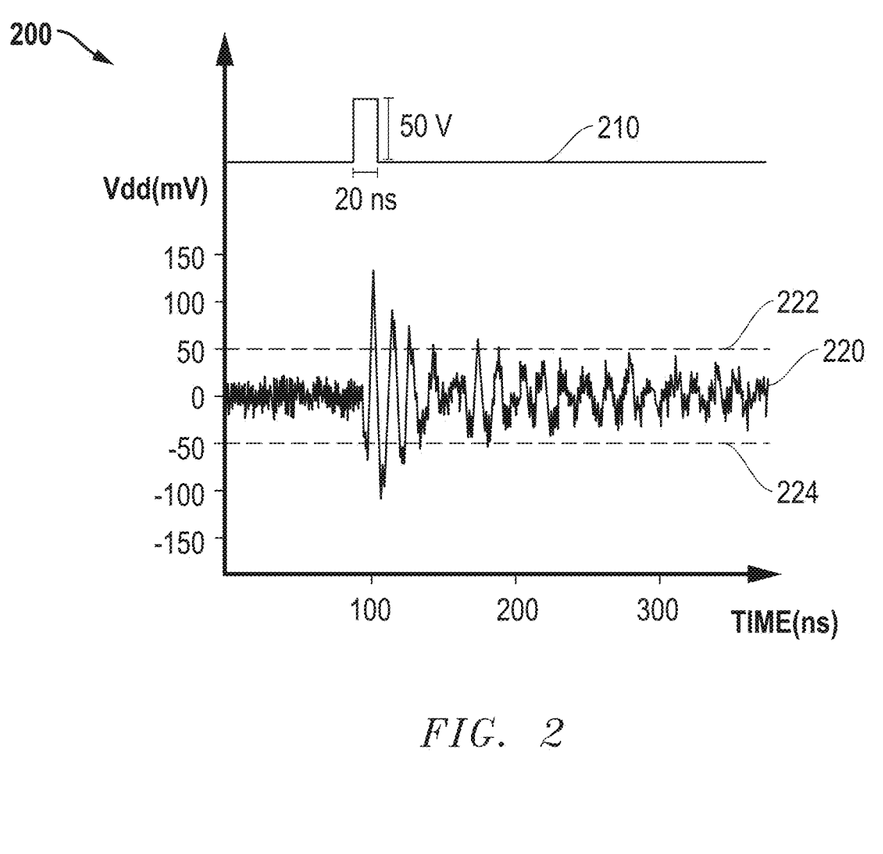
FIG. 2 illustrates a timing diagram of internal voltage oscillations caused by an EMP fault injection.

FIG. 2 illustrates a timing diagram 200 of internal voltage oscillations caused by an EMP fault injection. In FIG. 2, the horizontal axis represents time in nanoseconds (ns), and the vertical axis represents the amplitude of signals in volts (V) or millivolts (mV) as the case may be. Timing diagram 200 shows a waveform 210 of an electromagnetic pulse and a waveform 220 of the deviation of the power supply voltage (Vdd) from its nominal value, indicating the reception of the pulse on a local Vdd conductor. As shown in FIG. 2, the EMP fault injection system injects an EMP having a magnitude of 50 V and a duration of 20 ns at around 100 ns after a reference time point designated as time 0 on the horizontal axis. The EMP causes an oscillation of Vdd, which can cause program failure when the deviation is outside of certain tolerable amounts. As shown in FIG. 2, these tolerable limits include an upper threshold 222 equal to +50 mV above nominal value and a lower threshold 224 equal to −50 mV below nominal value. In the example shown in FIG. 2, the EMP produces timing faults as a result of voltage glitches because waveform 220 exceeds a high Vdd deviation of +50 mV, and a low Vdd deviation of −50 mV. FIG. 2 shows that duration of the pulse of as being 20 ns, and EMP fault injection system 100 requires time on the order of several hundred ns up to a few us to prepare for another discharge.

Figure 3:
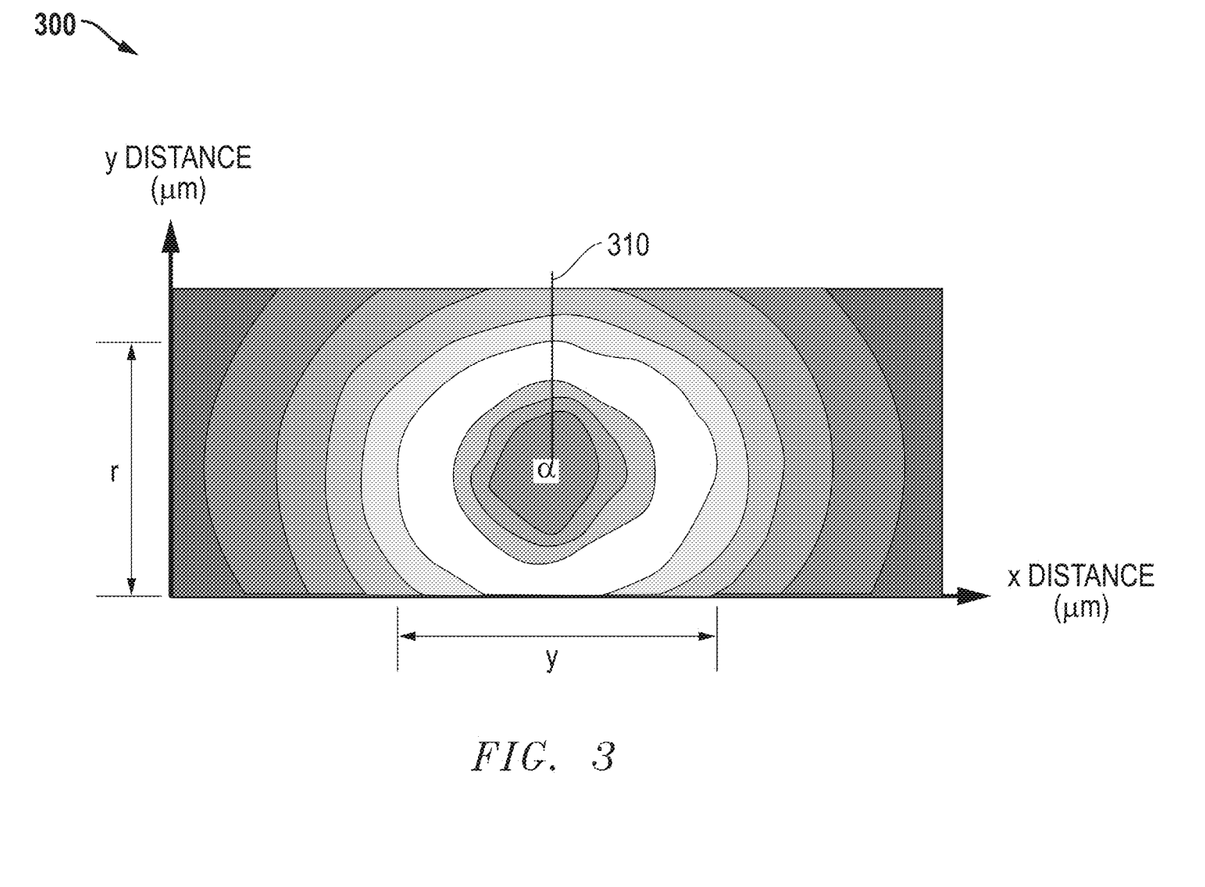
FIG. 3 illustrates a spatial diagram of an EMP-induced magnetic field in an integrated circuit device.

FIG. 3 illustrates a spatial diagram 300 of an EMP-induced magnetic field in an integrated circuit device. Spatial diagram 300 shown an EMP probe 310 in proximity to the active surface of an integrated circuit. In the illustrated example, the EMP injection generates an intense and sudden variation of the magnetic field in a vicinity close to the targeted device and/or portion of the targeted device. EMP probe 310 has a one-turn, 100 micrometer (μm) in diameter loop and induces a magnetic field in the target device that diminishes as the distance from the injection increases. The faults induced by EMP probe 310 are highly localized, as illustrated in spatial diagram 300.

Figure 4:
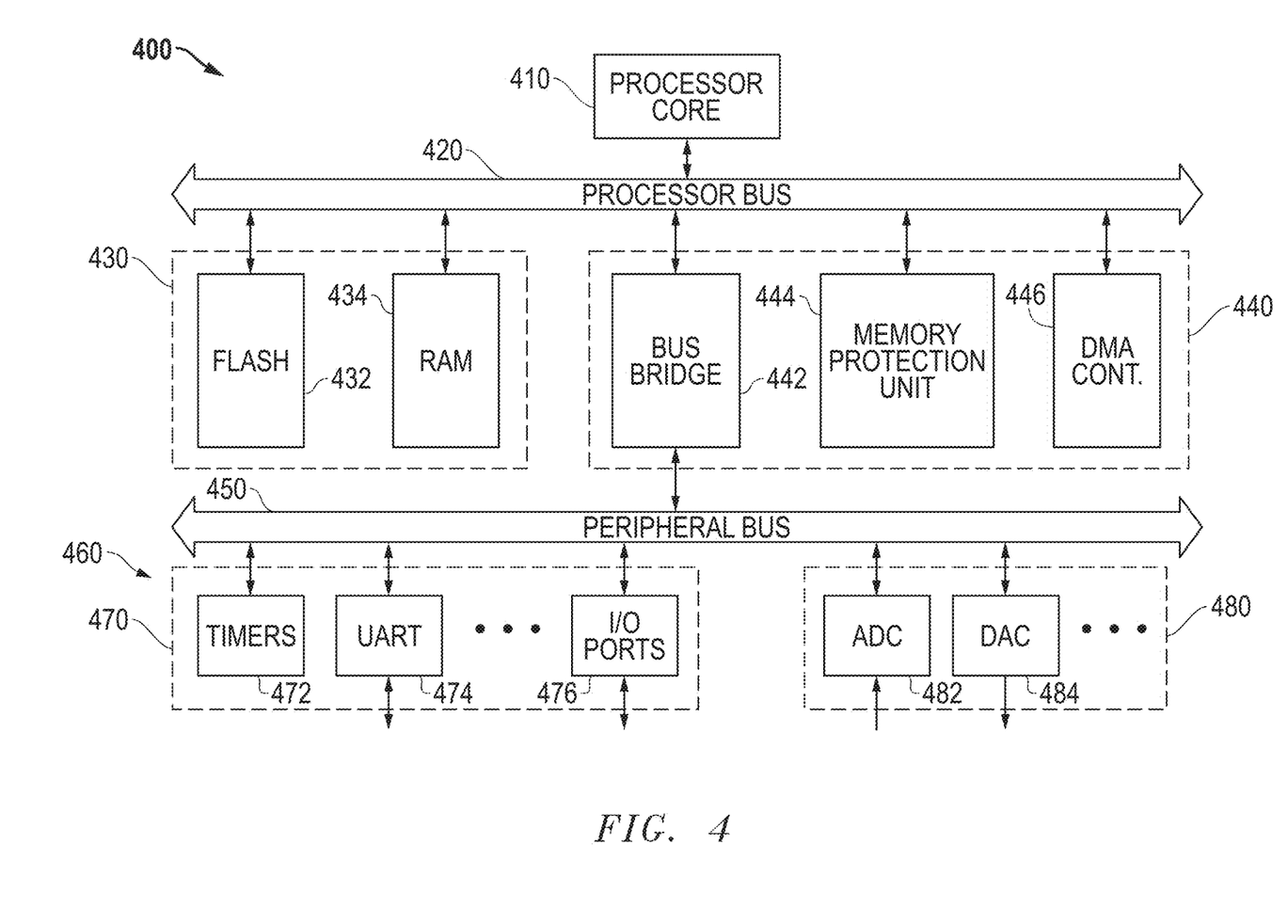
FIG. 4 illustrates in block diagram form an MCU that may be subject to hacking attempts.

FIG. 4 illustrates in block diagram form an MCU 400 that may be subject to hacking attempts. MCU 400 includes generally a processor core 410, a processor bus 420, on-chip memory 430, a set of processor bus peripherals 440, a peripheral bus 450, a set of digital peripherals 470, and a set of analog peripheral 480.

Processor core 410 is an embedded central processing unit (CPU) core, and can be any of a variety of known types, such as the Cortex M0 processor available from ARM Ltd. of Cambridge, England. Processor core 410 is bidirectionally connected to processor bus 420 and communicates address, data, and control signals to or from processor bus 420.

On-chip memory 430 includes a flash memory 432 and a random access memory 434. Each of flash memory 432 and a random access memory 434 is bidirectionally connected to processor bus 420.

Processor bus peripherals 440 include a bus bridge 442, a memory protection unit 444, and a direct memory access (DMA) controller 446. Bus bridge 442 has a first bidirectional port connected to processor bus 420, and a second bidirectional port connected to peripheral bus 450. Both memory protection unit 444 and DMA controller 446 are bidirectionally connected to processor bus 420.

Digital peripherals 470 include a set of timers 472, a universal asynchronous receiver/transmitter (UART) 474, and a set of input/output (I/O) ports 476. Timers 472 are bidirectionally connected to peripheral bus 450. UART 474 has a first port bidirectionally connected to peripheral bus 450, and a second port for connection to an external device. I/O ports 476 have a first port bidirectionally connected to peripheral bus 450, and a second port for connection to one or more external devices. The specific set of peripherals shown as part of digital peripherals 470 is just one possible example and other types of digital peripherals are possible.

Analog peripherals 480 include an analog-to-digital converter (ADC) 482 and a digital-to-analog converter (DAC) 484. ADC 482 has an input for receiving an analog signal from an external device, and is bidirectionally connected to peripheral bus 450. DAC 484 is bidirectionally connected to peripheral bus 450, and has an output for providing an analog signal to an external device (not shown in FIG. 4). The specific set of peripherals shown as part of analog peripherals 480 is likewise just one possible example and many other types and combinations of analog peripherals are possible.

In operation, MCU 400 is a highly integrated microcomputer system that is useful for performing a variety of embedded control functions in a wide variety of applications such as handheld electronics, consumer appliances, and electronic payment cards, also known as "smartcards". The basic operation of MCU 400 is well known to those of ordinary skill in the art and will not be described in detail.

MCU 400 is vulnerable to hacking through the injection of EMP pulses such as those provided by EMP fault injection system 100 of FIG. 1. If MCU 400 were a smartcard, a hacker could gain access to valuable information including electronic payment information, personal records, etc. One technique for hacking into MCU 400 is to generate an EMP during a routine that sets a variable that will be used in a conditional branch instruction or during a conditional branch instruction based on the value of the variable. If the value of the variable can be disrupted, then the program flow can be altered and allow a malicious hacker to substitute software that examines the state of processor core 410 and the components in MCU 400 to gain permanent access.

The inventor has discovered that this vulnerability can be prevented with no significant change in the functioning or operation of MCU 400 by intelligently re-writing software. Thwarting the EMP attack can be accomplished by "fooling" software that converts source code programs into machine-readable object code to survive the EMP attack without allowing hackers to gain control of the system. The details of this technique will be now explained further.

Figure 5:
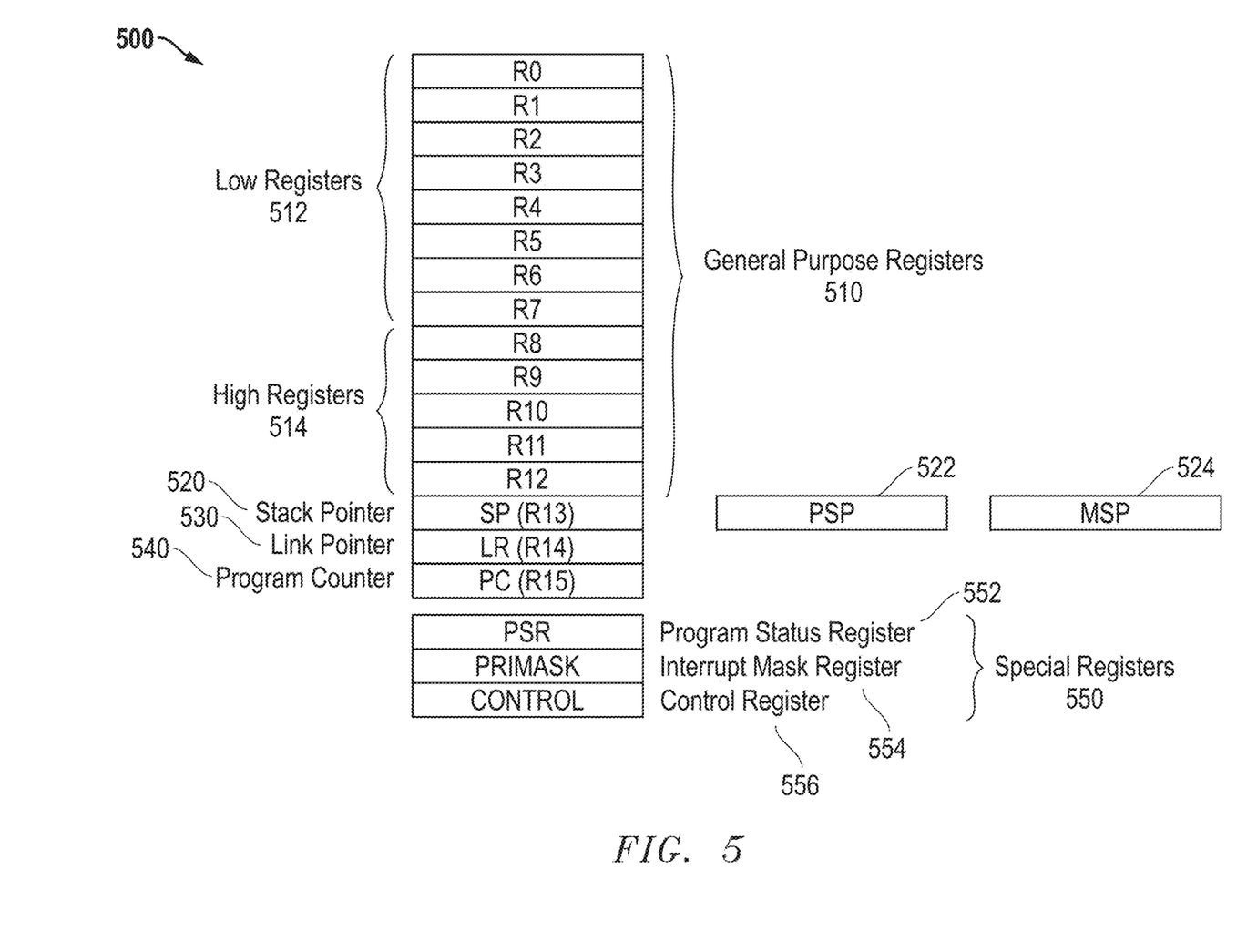
FIG. 5 illustrates a programmer's model of an architectural register file of the processor core of the MCU of FIG. 4.

FIG. 5 illustrates a programmer's model of an architectural register file 500 of processor core 410 of MCU 400 of FIG. 4. The exemplary processor core is a Cortex M0 processor. Architectural register file 500 has a set of general purpose registers 510, a stack pointer (SP) 520, a link register (LR) 530, a program counter (PC) 540, and a set of special registers 550.

General purpose registers 510 include eight low registers 512 labeled "R0" through "R7", respectively, and a set of five high registers 514 labeled "R8" through "R11", respectively. Stack pointer register 520 is either a process stack pointer (PSP) 522 or a main stack pointer (MSP) 524, depending on the program execution context, and corresponds to a register labeled "R13". Link register 530 corresponds to a register labeled "R14". Program counter 540 corresponds to a register labeled "R15" to round out a set of sixteen registers. Special registers 550 include a program status register 532 labeled "PSR", an interrupt mask register 554 labeled "PRIMASK", and a control register 556 labeled "CONTROL".

The registers in architectural register file 500 are used for instruction processing, branching, and other normal functions associated with normal microprocessor program flow. Each register in programmer's model 500 has the same native width. In the case of the Cortex M0 processor illustrated in FIG. 5, the native width is 32 bits. The inventor has discovered that the native width of the register file of processor core 410 can be advantageously used to prevent a security vulnerability that would ordinarily be caused by the insertion of an EMP pulse at a particular point in program flow. Thus MCU 400 and a corresponding software system that operates with MCU 400 operate with enhanced security relative to known systems.

Figure 6:
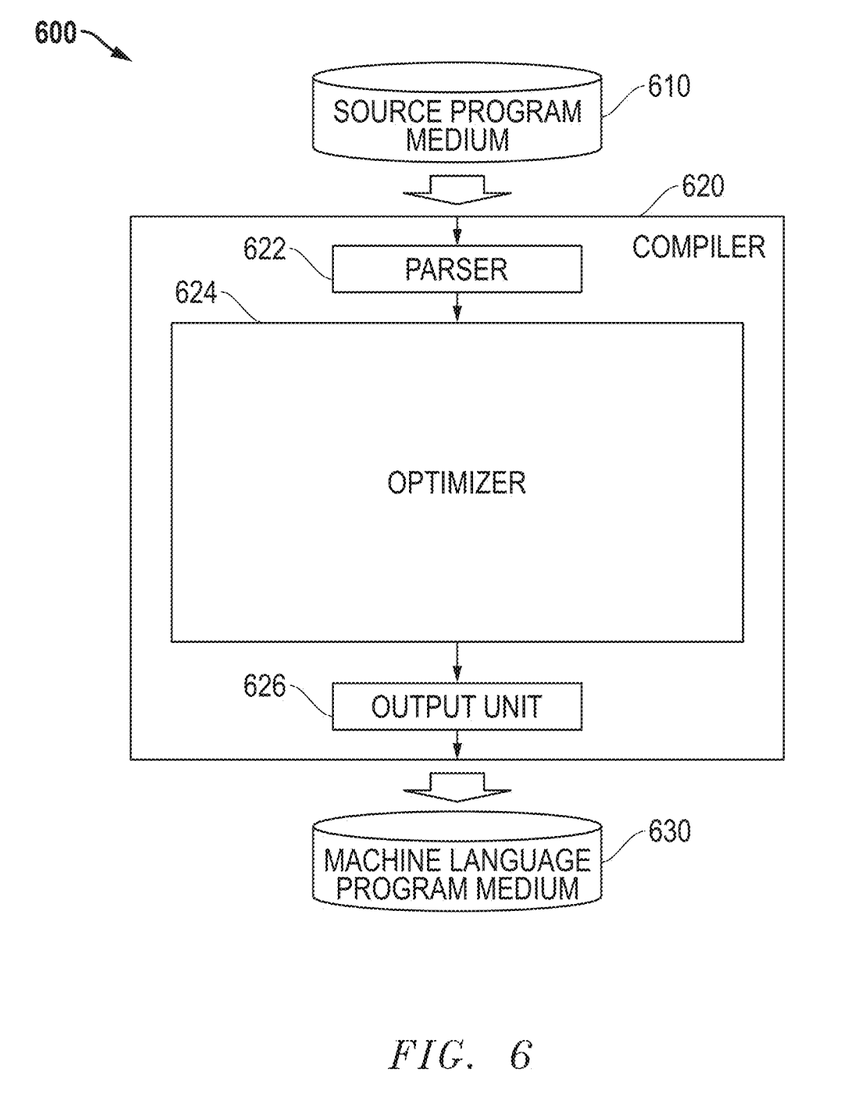
FIG. 6 illustrates in block diagram form a software system according to some embodiments of the present disclosure.

FIG. 6 illustrates in block diagram form a software system 600 according to some embodiments. Software system 600 includes generally a source program medium 610, a compiler 620, and a machine language program medium 630. Source program medium 610 is a non-transitory storage medium such as a hard disk drive, a non-volatile memory such as a flash memory, or other similar storage media. The source code program is written in one of a variety of programming languages, such as C++, Java, or the like. Compiler 620 translates the source code program into a machine language (object code) program that can be executed by processor core 410. Compiler 620 has an output for providing the machine language program to machine language program medium 630. Machine language program medium 630 can be a non-transitory storage medium such as a hard disk drive, a non-volatile memory such as a flash memory, or other similar storage medium, or a transitory storage medium such as static random access memory (SRAM), dynamic random access memory (DRAM), or the like.

Compiler 620 includes a parser 622, an optimizer 624, and an output unit 626. Parser 622 reads the characters that form the declarations, statements, etc. of the source program and translates them into an intermediate language, such as assembly language for the particular processor. The majority of the size and work of compiler 620 is performed by optimizer 624, shown graphically as a much larger box than parser 622 and output unit 626 in compiler 620 in FIG. 6. Optimizer 624 tries to minimize the size and/or execution time of the program by transforming the assembly language program into an equivalent assembly language program that executes with fewer machine language instructions and/or takes less time. Output unit 626 converts the optimized assembly language program and converts it into a machine language (binary) program and then outputs the machine language program for storage in machine language program medium 630. Compiler 620 thus compiles the program for execution on a target data processor, in this case processor core 410.

While compilers such as compiler 620 perform important functions for efficient program operation using source code written in popular programming languages such as C++, it contains a security vulnerability that makes the machine language program susceptible to EMP disruption. The inventor has discovered, however, that by writing an optimizer-aware source code program, or by converting an existing source-code program into an optimizer-aware source code program, this security vulnerability can be avoided. The security vulnerability created by using optimizer 624 will now be explained by reference to a concrete example.

Figure 7:
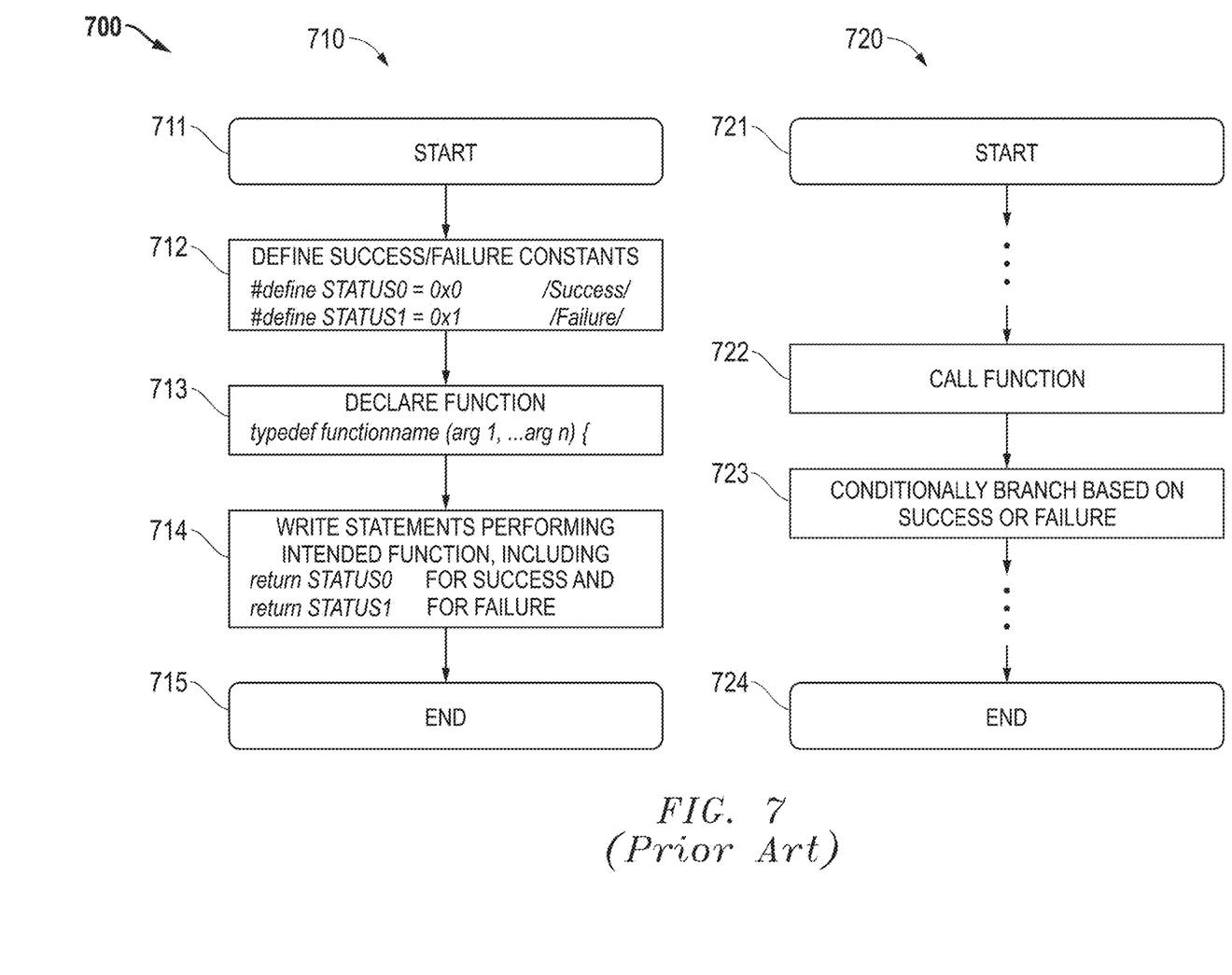
FIG. 7 illustrates a flow diagram showing a portion of a source code program having a first function and a second function that calls the first function known in the prior art.

FIG. 7 illustrates a flow diagram 700 showing a portion of a source code program having a first function 710 and a second function 720 that calls first function 710 known in the prior art. In this and the following examples, the source code is written in the C++ programming language. In C++, a function or sub-routine typically receives values known as arguments from the calling program and returns a success or failure indication in addition to result values.

First function 710 starts at box 711. First function 710 next defines certain constants, including the success and failure values. For example and according to convention, a success variable labeled "STATUS0" can be defined as 0x0 (hexadecimal 0) whereas a failure variable labeled "STATUS1" can be defined as 0x1 (hexadecimal 1). In this system, the compiler maps the constants into register values by inserting leading zeros. Next at action box 713, first function 710 declares its function using standard syntax for the C++ programming language, in which the function has a type indicated by typedef, a name indicated by functionname, and a series of arguments that are passed to it labeled "arg 1" through "arg n" enclosed in parentheses. Action box 714 includes writing statements that perform the intended function. These statements follow the declaration between the open bracket "{" and the close bracket "}" and may themselves call other functions. Action box 714 also selectively passes the success or failure constants back to the calling function based on whether the function correctly executed when returning program flow to the calling function. First function 710 ends at box 715.

Second function 720 starts at box 721. Second function 720 may be the main program or another function and calls the first function in box 722. Box 723 follows box 722 and is the return point for first function 710. Included in box 723 is a change of program flow implemented by a conditional branch based on whether first function 710 returned the success constant or the failure constant. Second function 720 ends at box 724.

Box 723 contains a possible point of failure if an EMP pulse is inserted at the time it is executed. When the conditional branch is executed, if the condition recorded in program status register 552 is reversed, the program flow can be erroneously re-routed to allow a hacker to gain control of the program. One straightforward technique to try to avoid this security vulnerability will now be described.

Figure 8:
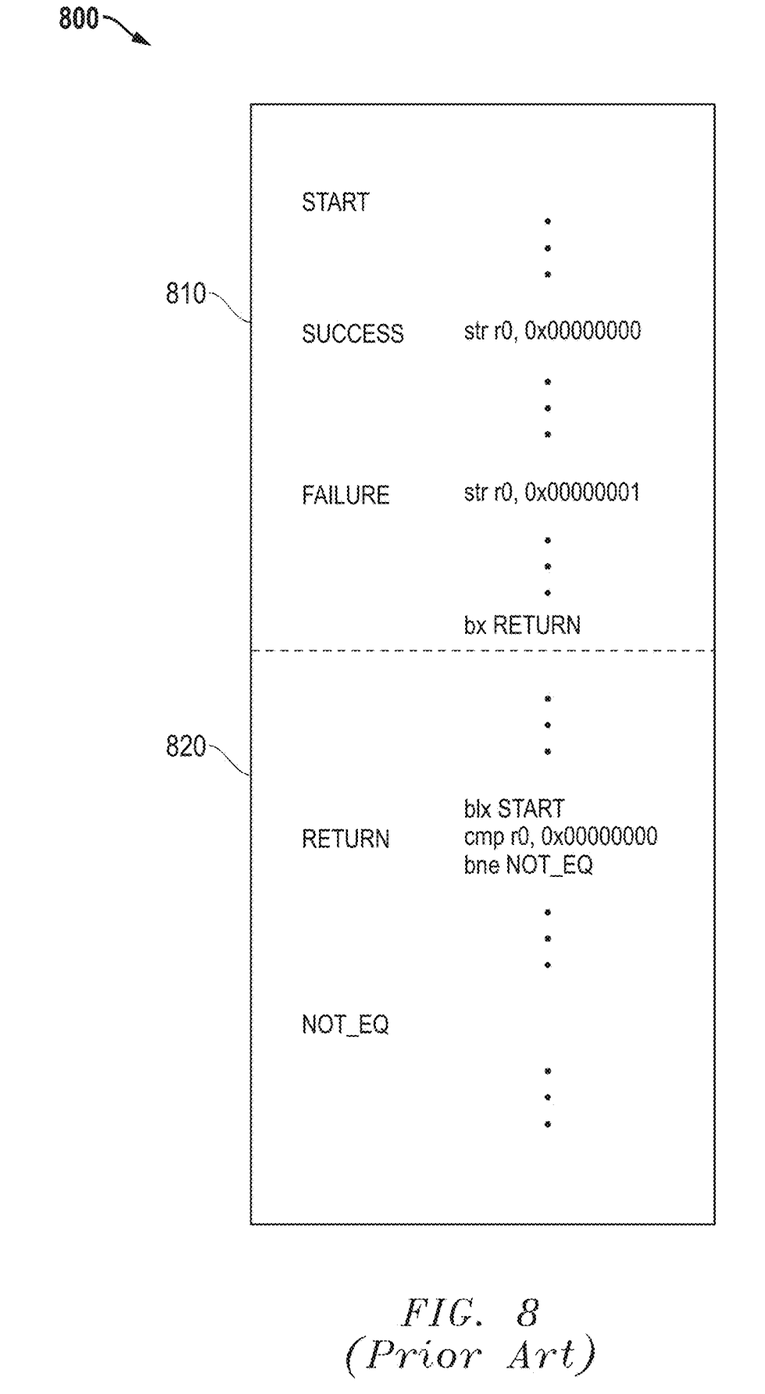
FIG. 8 illustrates an exemplary assembly language program corresponding to the flow diagram of FIG. 7.

FIG. 8 illustrates an exemplary assembly language program 800 corresponding to flow diagram 700 of FIG. 7. As shown in FIG. 8, assembly language program 800 includes a first portion 810 corresponding to first function 710 of FIG. 7, and a second portion 820 corresponding to second function 720 of FIG. 7. First portion 810 has a starting point that in this example is labeled "START". First portion 810 performs a series of operations that will vary widely based on the intended function. Within first portion 810 is a success instruction at an address corresponding to the label "SUCCESS" and containing instruction str r0, 0x00000000 that stores the value 0x0 in 32-bit register r0 (i.e. register R0 in architectural register file 500). First portion 810 also includes a failure instruction at an address corresponding to the label "FAILURE" and containing instruction str r0, 0x00000001 that stores the value 0x1 in 32-bit register r0. At the end of first portion 810 is a branch instruction bx RETURN that branches to the RETURN address of the calling routine.

Second portion 820 has a starting point not shown in FIG. 8. Second portion 820 performs a series of operations that will vary widely based on the intended function. Second portion 820 calls first portion 810 using the instruction blx START, which branches with link and calls the subroutine corresponding to the first portion 810 at an address corresponding to the START label. The address is stored in a general purpose register selected by the compiler. The next sequential instruction is at an address corresponding to the RETURN label. The first portion passes the success or failure indication in register r0, and second portion 820 compares the result to the success value of 0x00000000 using the assembly language instruction cmp r0, 0x00000000. If the program is operating properly, a failure occurs when the value in r0 is not equal to 0x00000000, such as the failure constant 0x00000001 defined in first portion 810. In the event of a failure, the condition will be evaluated as true, and program flow will branch to the instruction at the label "NOT_EQ".

Assembly language program 800 as illustrated has a security vulnerability. If an EMP occurs at either of two critical points, program operation can be disrupted to cause processor core 410 to skip, abort, or mess up instruction execution. The disruption can occur at one of two places. First, the EMP disruption can occur during the store operation (str r0, 0x00000000) in the first (called) function. Second, the EMP disruption can occur during the compare operation (cmp r0, 0x00000000) of the second (calling) function. Either of these glitches can allow a hacker to disrupt and potentially take control of execution of instructions provided to processor core 410.

Figure 9:
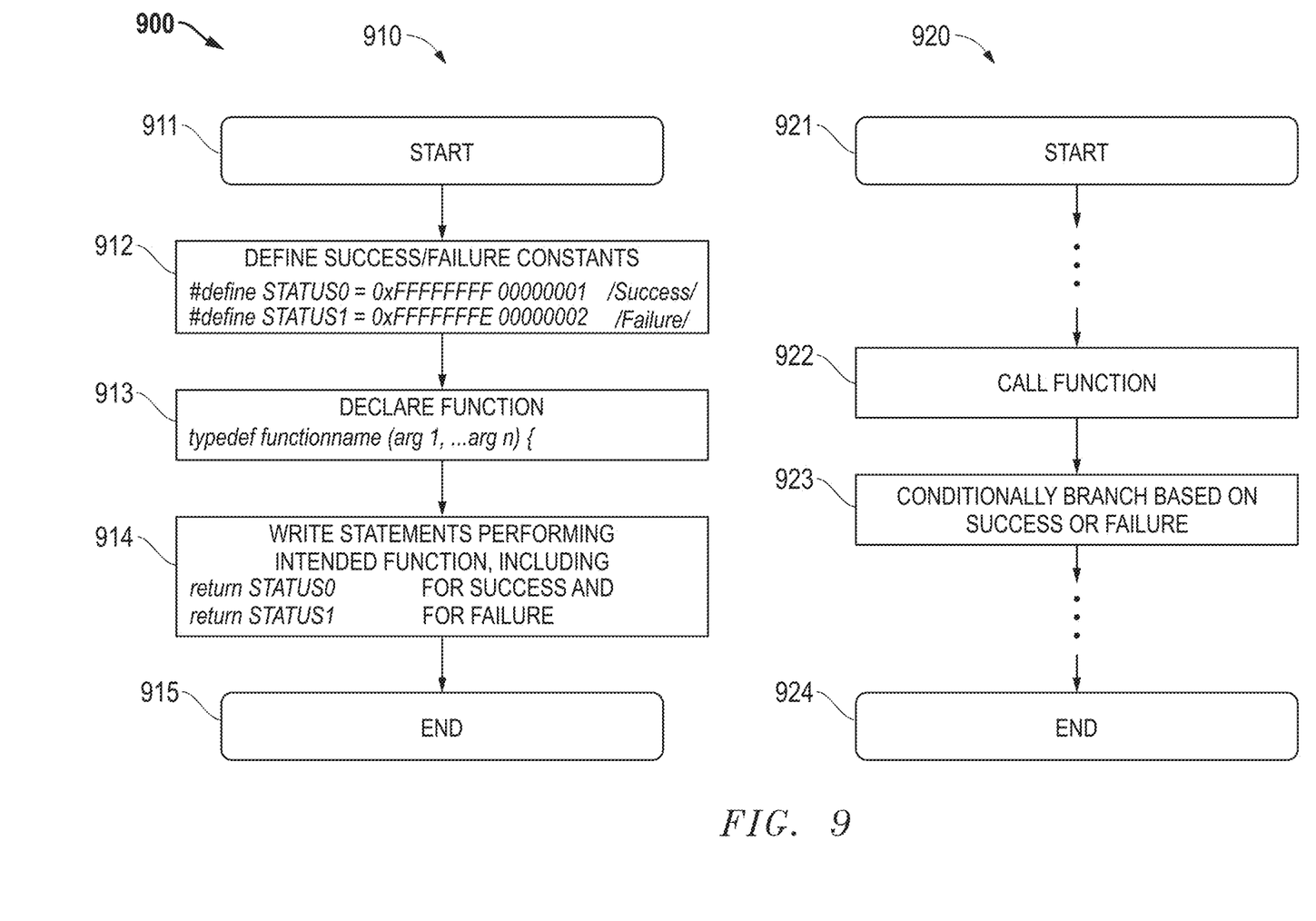
FIG. 9 illustrates a flow diagram showing a first function and a second function that calls the first function known according to an embodiment of the present disclosure.

FIG. 9 illustrates a flow diagram 900 showing a portion of a source code program having a first function 910 and a second function 920 that calls first function 910 according to an embodiment of the present disclosure. First function 910 starts at box 911. Flow proceeds to box 912 that defines success and failure constants. Instead of defining constants that correspond to the native data type of processor core 410, however, box 912 defines the constants to have a data type that is larger than the native data type. In this example, the native data type is 32 bits, and box 912 defines STATUS0 to have a value of 0xFFFFFFFF 00000001, and STATUS1 to have a value of 0xFFFFFFFE 00000002. At action box 913, first function 910 again declares its function using the format typedef functionname (arg1, . . . arg n) except that now the type is larger than the native data type, such as 64 bits in this example. Action box 914 includes writing statements that perform the intended function and that follow the declaration between the open bracket "{" and the close bracket "}" and may themselves call other functions. Action box 914 also selectively passes the success or failure constants back to the calling function based on whether the function correctly executed when returning program flow to the calling function. First function 910 ends at box 915.

Second function 920 starts at box 921. Second function 920 may be the main program or another function and calls the first function in box 922. Box 923 follows box 922 and is the return point for first function 910. Included in box 923 is a change of program flow based on whether first function 910 returned the success constant or the failure constant. Second function 920 ends at box 924.

The success or failure constants are not only set to a width greater than the native width of the registers. They also have high and low halves that are both different from each other and different from zero. The reason for setting the halves in this way will now be explained further.

Figure 10:
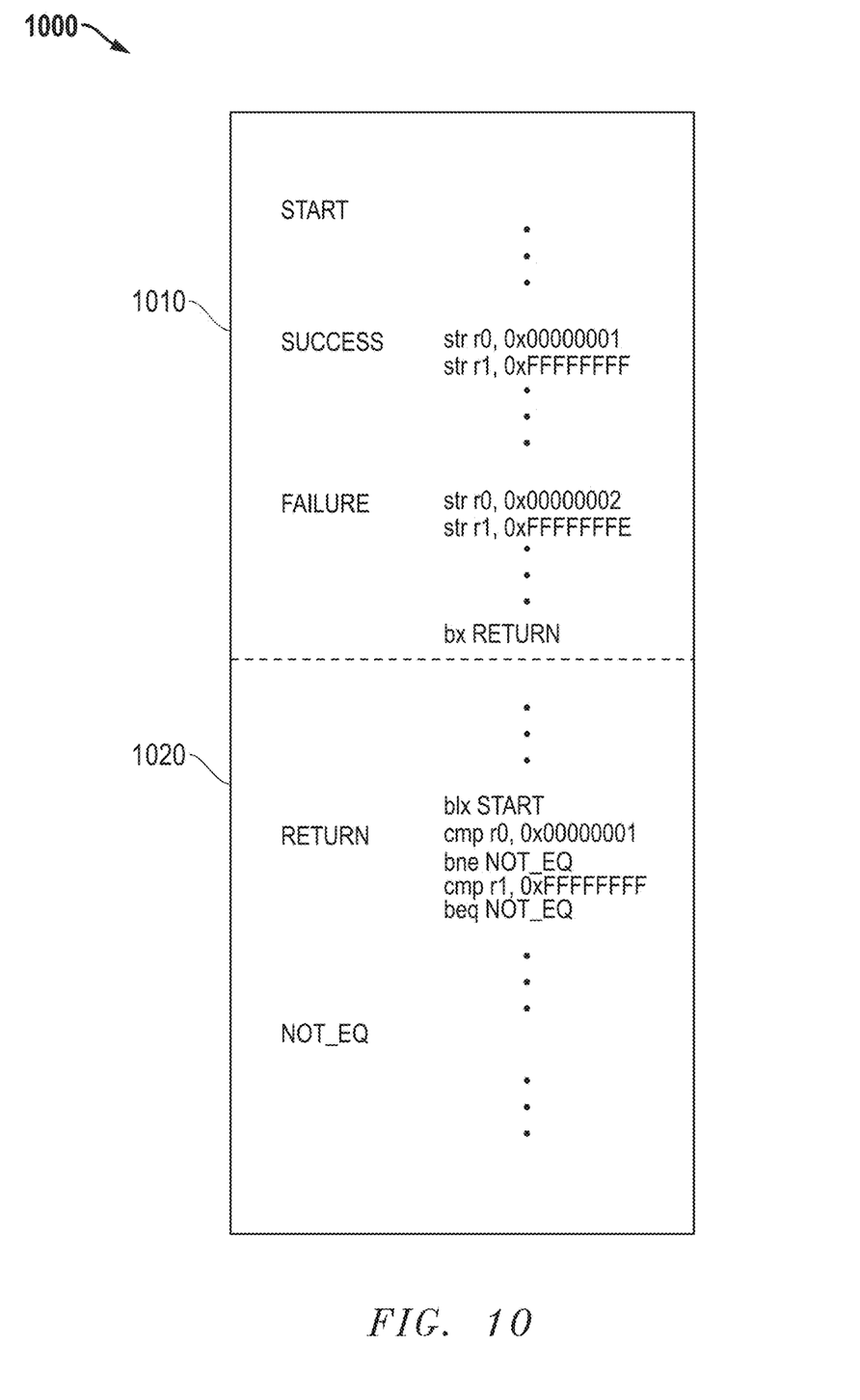
FIG. 10 illustrates an exemplary assembly language program corresponding to the flow diagram of FIG. 9.

FIG. 10 illustrates an exemplary assembly language program 1000 corresponding to flow diagram 900 of FIG. 9. As shown in FIG. 10, assembly language program 1000 is a set of instructions that includes a first portion 1010 corresponding to first function 910 of FIG. 9, and a second portion 1020 corresponding to second function 920 of FIG. 9. First portion 1010 has a starting point (START) and performs a series of operations that will vary widely based on the intended function. Within first portion 1010 is a success instruction at an address corresponding to the label "SUCCESS" and containing a pair of instructions str r0, 0x00000001 and str r1, 0xFFFFFFFF that stores the value 0x0 in 32-bit register r0 (i.e. register R0 in architectural register file 500) and the value 0xFFFFFFFF in 32-bit register r1. First portion 1010 also includes a failure instruction at an address corresponding to the label "FAILURE" and containing instruction str r0, 0x00000002 and str r1, 0xFFFFFFFE that store the value 0x00000001 in 32-bit register r0 and the value 0xFFFFFFFF in 32-bit register r1. At the end of first portion 1010 is a branch instruction bx RETURN that branches to the RETURN address of the calling routine.

Second portion 1020 has a starting point not shown in FIG. 10. Second portion 1020 performs a series of operations that will vary widely based on the intended function. Second portion 1020 calls first portion 1010 using the instruction blx START, which branches with link and calls the subroutine corresponding to the first portion 1010 at an address corresponding to the START label. The address is stored in a general purpose register selected by the compiler. The next sequential instruction is at an address corresponding to the RETURN label. The first portion passes the success or failure indication in registers r0 and r1, and second portion 820 compares the result to the success value of 0xFFFFFFFF 00000001 using the assembly language instructions cmp r0, 0x00000001 and cmp r0, 0xFFFFFFFF. If the program is operating properly, a failure occurs when the value in r0 is not equal to 0x00000001, such as the failure constant 0x00000002 defined in first portion 1010, and/or the value in r1 is not equal to 0xFFFFFFFF, such as the failure constant 0xFFFFFFFE defined in first portion 1010. In the event of a failure, one of the conditions will be evaluated as true, and program flow will branch to the instruction at the label "NOT_EQ".

Assembly language program 1000 requires the failure of two store instructions or the failure of either of two compare instructions to disrupt the program flow successfully. Since the store instructions are compiled in successive locations, and the two compare instructions are separate by only a single conditional branch instruction, it would difficult or impossible to generate an EMP glitch fast enough to disrupt both instructions using known EMP generation systems. EMP fault injection system 100 generates a pulse that occupies both space and time and it would not be practical to repeat an EMP discharge when a previous EMP pulse was still oscillating. For example as shown above, a 20 ns pulse produces significant oscillations for more than 200 ns, which represents the execution times of several instructions with current processor speeds. Moreover pulse generator 130 charges a capacitor which is rapidly discharged through EMP probe 140. Re-charging the capacitor using the same power supply used to power the host computer system requires a significant amount of time.

Moreover, assembly language program 1000 not only uses success and failure constants that are greater than the native, 32-bit width of the registers used in the programmer's model, they also have two halves that are different from each other and different from zero. This latter characteristic prevents optimizer 624 from converting the two values back into a single value in the optimization process. To understand that result, consider the following example. If the program merely made set the typedef for the success and failure constants to be greater the native register width, then optimizer 624 would simplify the variable into an equivalent 32-bit value during the optimization process. Consider the following example. If the type of STATUS0 and STATUS 1 were 64-bit unsigned integer, and the values were programmed as 0x0 and 0x1, respectively, then parser 622 would compile those values to 0x00000000 00000000 and 0x00000000 00000001, respectively. However optimizer 624 will simplify the two store and compare operations to one store operation and one compare operation to a single register having the normal native width, because the 0x00000000 upper word does not change based on the function's success or failure. However by making the upper and lower 32-bit words different from 0 and different from each other, optimizer 624 will not re-write the instructions.

In a related embodiment, the source code program could define a new status function that converts existing status constants into new constants that have these properties. For example, the program can define a new status using the C++ declaration:

```
#define newstatus(old_status) {
        r1 <= ~old_status<<32|old_status;
        return (status1)
}
```

Thus the computer system and software system disclosed above improve the operation of known computer systems by making them harder to tamper with or hack. The system uses success and failure constants that are larger than the native width of the processor core that the software is running on. Moreover the constants have two parts that are different from zero and different from each other. Using this technique, it is difficult or impossible for systems to be successfully tampered with at the point of calling or returning from a function call, even when an optimizer is used in the compiler. A further function may also be used to convert existing source code into tamper resistant source code.

The above-disclosed subject matter is to be considered illustrative, and not restrictive, and the appended claims are intended to cover all such modifications, enhancements, and other embodiments that fall within the true scope of the claims. While the present example used a native width of 32, any other native width is possible. Likewise while the present example used the C++ object oriented language, any other object oriented language (such as Java) and higher level language can be used, provided they allow variable typing. Moreover the disclosed software system contemplated a wide variety of functions. Thus, to the maximum extent allowed by law, the scope of the present invention is to be determined by the broadest permissible interpretation of the following claims and their equivalents, and shall not be restricted or limited by the foregoing detailed description.

What is claimed is:

1. A software system, comprising:
 a first non-transitory computer readable medium storing a source code program comprising:
  a first function having a return type greater than a native width of a target processor; and
  a second function that calls the first function and that conditionally branches based on comparing a returned value from the first function to an expected value, wherein the expected value has first and second portions each having the native width that are not equal to zero and are not equal to each other;
 a second computer readable medium; and
 a compiler that converts the source code program in the first non-transitory computer readable medium into a machine language program for storage in the second computer readable medium and execution by the target processor, said compiler optimizing the source code program by selectively combining a set of redundant machine language instructions into a smaller set of machine language instructions.

2. The software system of claim 1, wherein the native width is 32 bits and the return type is 64 bits.

3. The software system of claim 1, wherein the first and second functions are C++ functions.

4. The software system of claim 3, wherein the second function is a main program.

5. The software system of claim 1, wherein the source code program declares the first function using a type definition of a size greater than the native width of the target processor.

6. The software system of claim 1, further comprising:
a third function for converting a return status having the native width to a new return status having a width greater than the native width.

7. The software system of claim 1, wherein the compiler comprises:
a parser coupled to the first non-transitory computer readable medium and translating instructions of the first and second functions into corresponding machine language instructions;
an optimizer coupled to said parser for analyzing said corresponding machine language instructions and reducing a size of said corresponding machine language instructions to provide an optimized set of machine language instructions; and
an output unit for storing said optimized set of machine language instructions in said second computer readable medium.

8. A software system, comprising:
a first non-transitory computer readable medium storing a source code program comprising:
a first function that defines a success status and a failure status each having a width greater than an architectural width of a target processor, wherein each of the success status and the failure status has first and second portions each having the architectural width that are not equal to zero and are not equal to each other, and said first function selectively returns one of the success status and the failure status to a calling program; and
a second function that calls the first function and conditionally branches based on whether the first function returns the success status or the failure status;
a second computer readable medium; and
a compiler that converts the source code program in the first non-transitory computer readable medium into a machine language program for storage in the second computer readable medium and execution by the target processor, said compiler optimizing sets of redundant instructions and selectively combining said sets of redundant instructions into a corresponding single machine language instruction.

9. The software system of claim 8, wherein the first and second portions of each of the success status and the failure status have a size equal to the architectural width of the target processor.

10. The software system of claim 9, wherein the size of each of the first and second portions of each of the success status and the failure status is equal to thirty-two bits.

11. The software system of claim 8, wherein the first and second functions are C++ functions.

12. The software system of claim 8, wherein the source code program declares the first function using a type definition of a size greater than the architectural width of the target processor.

13. The software system of claim 8, wherein the compiler comprises:
a parser coupled to the first non-transitory computer readable medium and translating instructions of the first and second functions into corresponding machine language instructions;
an optimizer coupled to said parser for analyzing said corresponding machine language instructions and reducing a size of said corresponding machine language instructions to provide an optimized set of machine language instructions; and
an output unit for storing said optimized set of machine language instructions in said second computer readable medium.

14. A method comprising:
providing a first function of a source code program, wherein said providing includes defining a type of said first function to be greater than a native width of a target processor and returning a status based on execution of the first function;
providing a second function of said source code program, wherein said second function calls the first function and conditionally branches based on comparing a returned value from the first function to an expected value, wherein the expected value has first and second portions each having said native width that are not equal to zero and are not equal to each other;
compiling said source code program into a corresponding machine language program and execution by said target processor using an optimizing compiler that optimizes the source code program by selectively combining a set of redundant machine language instructions into a smaller set of machine language instructions; and
storing said corresponding machine language program in a computer readable medium.

15. The method of claim 14, wherein:
said storing comprises storing said corresponding machine language program in a memory of a microcontroller; and
said microcontroller further comprises said target processor.

16. The method of claim 14, wherein defining said type of said first function to be greater than said native width of the target processor comprises:
defining said type to be 64 bits wherein said native width of the target processor is 32 bits.

17. The method of claim 14, wherein said providing said first function of said source code program and said providing said second function of said source code program comprises:
providing C++ functions.

18. A microcontroller, comprising:
a central processing unit for executing instructions using registers of an architectural register file each having a native width; and
a memory coupled to the central processing unit for storing a plurality of instructions executable by the central processing unit comprising:
a first function having an entry point and a plurality of instructions including a first instruction that stores a first value having the native width in a first register of the architectural register file, a second instruction having the native width that stores a second value in a second register of the architectural register file, and a third instruction that returns program control to a calling function, wherein the first and second values and the first and second registers have the native width, and wherein the first and second values are not equal to zero and are not equal to each other; and
a second function that calls the first function and conditionally branches based on whether said first value is equal to a first predetermined value and the second value is equal to a second predetermined value.

19. The microcontroller of claim 18, wherein:
said native width is 32 bits.

20. The microcontroller of claim 18, wherein:
said memory comprises a non-volatile memory.

\* \* \* \* \*